Nov. 20, 1934.   A. J. RECHLICZ   1,981,285
COMBINATION AND CONVERTIBLE BABY WALKER
Filed March 21, 1932   2 Sheets-Sheet 1

INVENTOR.
Anthony J. Rechlicz,
BY Morsell & Morsell
ATTORNEYS.

Nov. 20, 1934. A. J. RECHLICZ 1,981,285
COMBINATION AND CONVERTIBLE BABY WALKER
Filed March 21, 1932 2 Sheets-Sheet 2
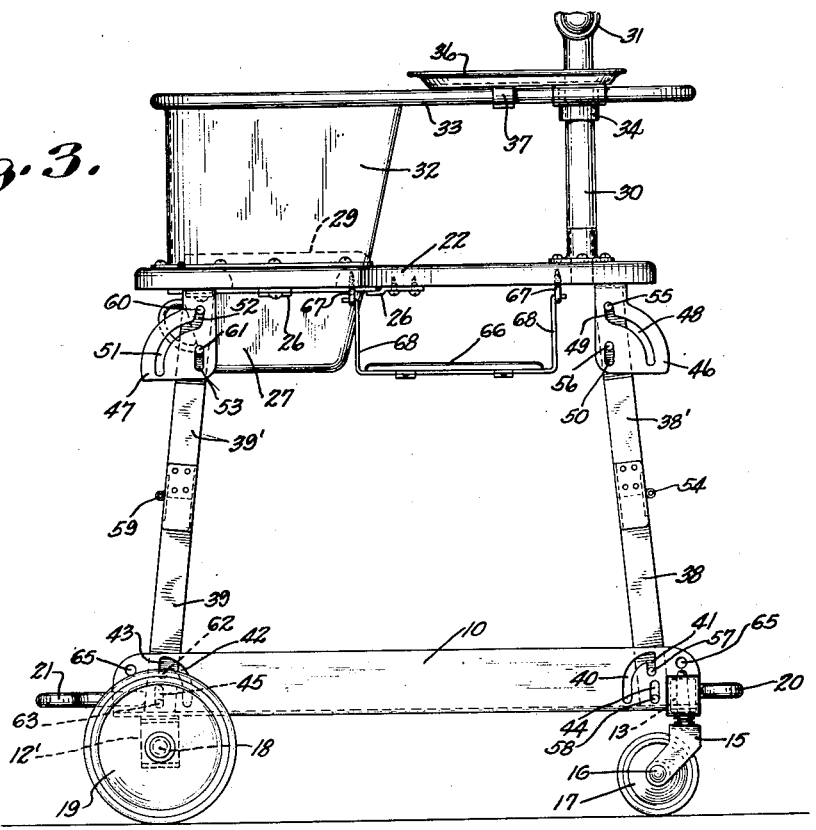
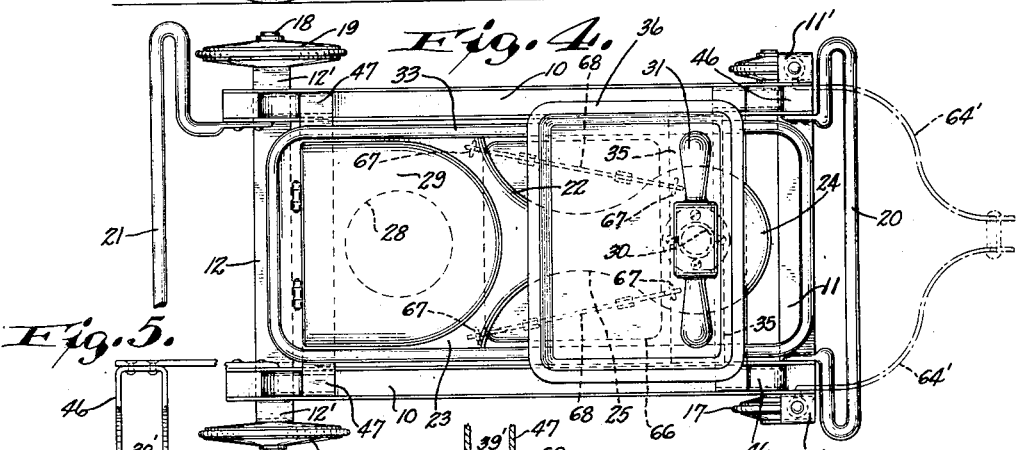
INVENTOR.
Anthony J. Rechlicz,
BY Morsell & Morsell
ATTORNEYS.

Patented Nov. 20, 1934

1,981,285

UNITED STATES PATENT OFFICE 1,981,285

COMBINATION AND CONVERTIBLE BABY WALKER

Anthony J. Rechlicz, Milwaukee, Wis.

Application March 21, 1932, Serial No. 600,175

1 Claim. (Cl. 155—38)

This invention relates to improvements in baby walkers, and more particularly to a combination and convertible baby walker susceptible of serving as three distinct devices.

In confined and limited living quarters, space can not be taken up by an undue number of pieces of furniture, and this is especially true with respect to pieces of furniture, appliances and paraphernalia for infants. The present invention recognizes this difficulty and combines in a single unitary structure three pieces of furniture or appliances normally required for an infant— namely, a baby walker, a high chair, and a commode or nursery chair.

A further object of the invention is to provide a wheeled baby walker susceptible of being propelled or pulled in the usual manner, which can, by a simple manipulation, be converted into an infant's high chair for feeding purposes.

A further object of the invention is to provide a device of the character described having folding legs, extensible to raise the seat portion to convert the device into a high chair, and arranged so that in the lowered position of the device, as a baby walker, said legs are folded compactly into the frame or chassis.

A further object of the invention is to provide a convertible baby walker having seat carrying and elevating legs which extend or unfold in a very novel and effective manner and provide, in extended position, a very rigid support for the elevated seat.

A further object of the invention is to provide a combination and convertible baby walker having a commode receptacle removably attached thereto in a convenient and out-of-the-way position.

A further object of the invention is to provide a combination and convertible baby walker which is of very simple construction, is strong and durable, is neat and attractive in appearance, and is well adapted for the purposes set forth.

With the above and other objects in view, the invention consists of the improved baby walker, and its parts and combinations as set forth in the claim, and all equivalents thereof.

In the accompanying drawings in which the same reference characters indicate the same parts in all of the views:

Fig. 3 is a side view of the device in its fully extended position for use primarily as a high chair;

Fig. 4 is a plan view of the showing in Fig. 3;

Fig. 5 is an enlarged detail sectional view taken on line 5—5 of Fig. 1;

Fig. 6 is an enlarged detail sectional view taken on line 6—6 of Fig. 1; and

Figure 1:
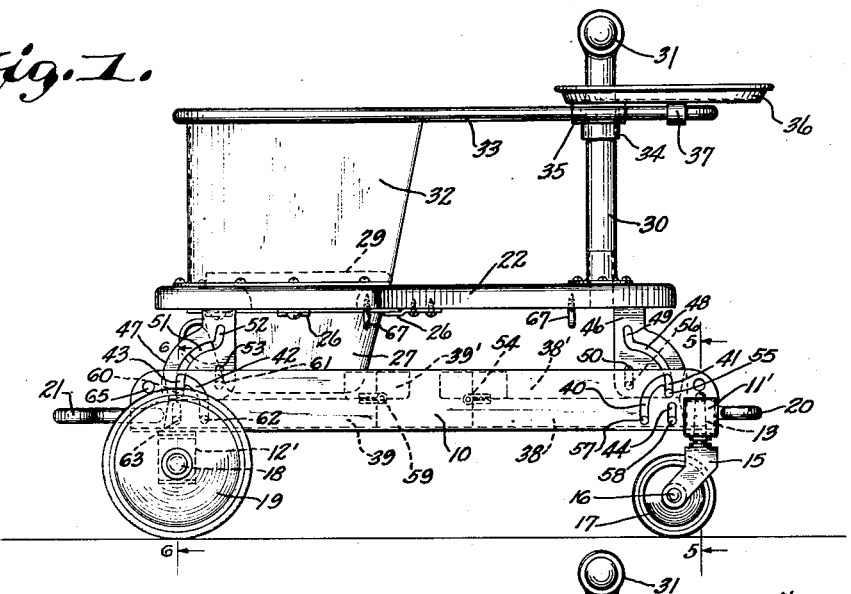
Fig. 1 is a side view of the improved combination and convertible baby walker in its collapsed form for use primarily as a baby walker.

Referring now more particularly to the drawings, it will appear that the frame or chassis of the combination and convertible baby walker includes a pair of spaced-apart channeled longitudinal members 10 carrying front and rear transverse frame bars 11 and 12 respectively. The ends of the front transverse bar 11 are bent upwardly into rectangular form, as at 11', and said portions 11' carry sleeves 13 which swivelingly receive the shanks 14 of front wheel supports 15. Each front wheel support carries a transverse axle pin 16 on which a front supporting wheel 17 is rotatably mounted. The end portions of the rear transverse frame bar 12 are bent downwardly into rectangular form, as at 12', and axle pins 18 are extended through said portions 12' and rotatably carry rear supporting wheels 19. The end portions of a front resilient bumper 20 are rigidly secured to the front end portions of the channeled longitudinal frame members 10, and the end portions of a similar resilient rear bumper 21 are secured to rear end portions of said frame members 10.

The seat 22 of the apparatus is shown clearly in Fig. 4 and has an enlarged rear portion 23, a rounded front end portion 24, and a reduced intermediate portion 25 adapted to be straddled by the legs of the infant. The undersurface of the rear seat portion 23 carries spaced clips 26 which are adapted to detachably engage the upper rim portion of a commode or nursery chair receptacle 27. Said clips 26 are so positioned and arranged that the receptacle may be slid into place in engagement with the clips, or withdrawn, by a movement rearwardly of the seat. The rear seat portion 23 is also provided with a relatively large, centrally located opening 28 registering with the receptacle, and said opening is normally closed by a hingedly mounted cover 29.

Projecting upwardly from the front rounded end portion 24 of the seat member is a vertical post 30 having a transverse handle 31 at its upper end portion. A back member 32, forming a seat back, is secured to and surrounds the edge portions of the sides and rear of the main seat portion 23. The upper edge portions of said back member 32 are secured to an annular guard rail 33, and form a support for the rear portions thereof. A hub 34 is rigidly mounted on an intermediate portion of the post 30, and said hub is formed with laterally projecting horizontal arms 35, which, at their end portions, embrace and support forward side portions of the guard rail 33. A tray 36 is medially pivotally mounted on the post 30 immediately above the hub 34, and may be pivotally swung from the out-of-the-way position shown in Figs. 1 and 2 to the normal position of use shown in Figs. 3 and 4. In either case the tray rests on and is supported by the guard rail 33 and the horizontal arms 35. The bottom portion of said tray is provided with depending spring clips 37, which, in either position of the tray, are adapted to be releasably engaged with portions of the rail 33 as shown, to releasably hold the tray in adjusted position.

Four pairs of folding legs or links are interposed between the seat 22 and the chassis or frame members 10, the legs or links of the forward pairs being designated by the numerals 38 and 38', and the legs or links of the rearward pairs being designated by the numerals 39 and 39'. The forward side wall portions of the chassis members 10 are formed with arcuate slots 40 which slots are curved upwardly forwardly and terminate in downwardly off-set locking slots 41. Similar slots 42 are formed in the rear side wall portions of said members 10 only said slots are upwardly rearwardly curved and terminate in downwardly off-set locking slots 43. Below the off-sets 41 are short vertical slots 44, and similar short vertical slots 45 are formed below the rear off-sets 43. The side front portions of the seat 22 carry depending channeled brackets 46, and similar depending brackets 47 are carried by the rear side portions of said seat. The upper front brackets 46 are formed with upwardly inwardly directed guide slots 48 which terminate in locking off-sets 49, and below the locking off-sets are short vertical slots 50. Similarly the upper rear brackets 47 are formed with upwardly inwardly directed guide slots 51 terminating in upper locking off-sets 52, and below the off-sets are short vertical slots 53.

Figure 2:
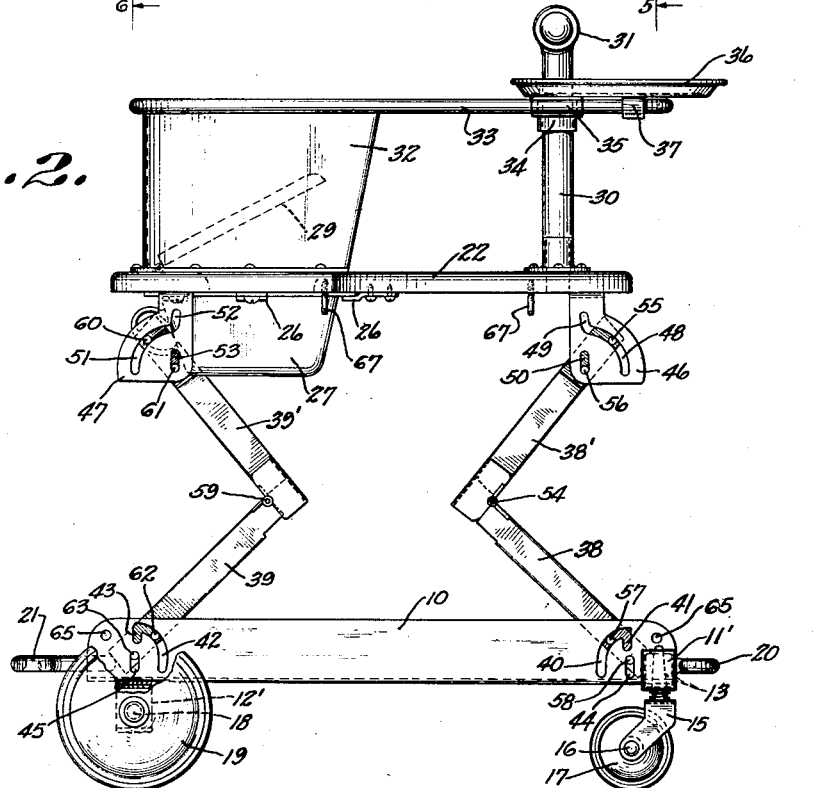
Fig. 2 is a side view of the device in a position of partial extension.
Figure 7:
Fig. 7 is a fragmentary detail view of the lower portion of the device showing the attachment of a handle therewith for pulling purposes.

The legs or links 38 and 38' of the forward pairs have their adjacent end portions hingedly connected together, as at 54, in a manner so that said links will break or fold inwardly with respect to each other, as shown in Fig. 2. The upper end portions of the links 38' carry laterally projecting pins 55 and 56 to ride in the slots 48 and 50 respectively of the upper brackets 46, and in this manner the front legs or links are connected with and carry the front portion of the seat 22. The lower end portions of the legs or links 38 are connected with the front end portions of the frame members 10 by means of laterally projecting pins 57 and 58 which ride in the lower slots 40 and 44 respectively in said members 10. The legs or links 39 and 39' of the rear pairs have their adjacent end portions hingedly connected together, as at 59, to break or fold inwardly with respect to each other. The upper end portions of the upper links 39' are connected with and carry the rear portion of the seat 22 by means of laterally projecting pins 60 and 61 which ride in the slots 51 and 53 respectively of the upper rear brackets 47. The lower end portions of the links 39 are connected with the rear end portions of the frame members 10 by means of laterally projecting pins 62 and 63 which ride in the lower slots 42 and 45 respectively.

Normally the apparatus is in the lowered or collapsed condition shown in Fig. 1, and in this condition it may be used as a baby walker, in the usual manner, the infant sitting on the seat portion 23 and straddling the portion 25 and propelling the apparatus with his feet. When in this lowered condition the pairs of legs 38—38' and 39—39' are folded in the manner shown in Fig. 1 and are housed within the channeled frame members 10. It should be noted that in this position all of the securing and guide pins 55, 56, 57, 58, 60, 61, 62 and 63 are in the lower portions of their respective slots. To convert the apparatus from a baby walker into a high chair it is merely necessary to raise the seat and upper portions carried thereby, with respect to the wheeled chassis. This is accomplished by pulling upwardly on the seat portion to extend the folding legs or links from their folded and housed horizontal positions to extended vertical positions going through the partially extended position shown in Fig. 2 until the fully extended position shown in Fig. 3 is reached. During such movements the various pins ride upwardly with respect to their slots until the fully extended position is reached, in which case the pins 57 and 62 are lodged in the lower extremities of the locking off-sets 41 and 43 respectively, and the pins 58 and 63 are lodged in the lower extremities of the short vertical slots 44 and 45 respectively. This arrangement serves to lock the parts rigidly in extended positions. To lower the apparatus it is first necessary to give a slight upward pull on the seat to move the pins 57 and 62 into the upper ends of the off-sets so that the same may subsequently be free to follow the slots 40 and 42. Said initial upward movement also moves the pins 58 and 63 into the upper ends of slots 44 and 45 and then, when the device is pushed downwardly, the legs will fold and the ends of the same will pivot principally on the pins 58, 63, 56 and 61, while the pins 57, 62, 55 and 60 will ride downwardly in their respective arcuate slots.

When the apparatus is lowered it is sometimes desirable to push or pull the same as a stroller. For that purpose a detachable handle 64 is provided which is formed with a yieldable forked inner end portion 64', the ends of which are insertable into apertures 65 therefor in the ends of the frame members 10. When the apparatus is elevated to the extended high chair position, a rest may be arranged for the infant's feet, and said rest comprises a base 66 detachably depended from eye bolts 67 on the underside of the seat portion 25, by means of U-straps 68 which carry said base 66 (see Figs. 3 and 4).

It is obvious that in either its collapsed or its extended condition the apparatus may be used as a nursery chair and the commode receptacle 27 is at all times readily removable, but normally occupies an out-of-the-way, inconspicuous position.

The improved apparatus serves the purposes normally served by three distinct pieces of infant's paraphernalia, and may by a simple manipulation be converted from one form to another. Also, the improved combination and convertible baby walker is both simple and novel, and is well adapted for the purposes set forth.

What is claimed as the invention is:

An infant's convertible apparatus comprising a wheeled chassis formed with longitudinally extending channel members at each side thereof, each channel member opening upwardly, a seat member, a pair of vertically extensible link members at each side of the seat and at the front and rear thereof and at each end of each channel member, means foldably connecting the adjacent ends of each pair of links to abut in end to end contact when the links are extended, means pivotally and shiftably connecting the outer ends of the links to the seat member and channel member respectively, whereby the links in each pair are foldable one upon the other within the channel member when the seat member is lowered.

ANTHONY J. RECHLICZ.